United States Patent
Blum

(10) Patent No.: US 11,109,139 B2
(45) Date of Patent: Aug. 31, 2021

(54) SYSTEMS AND METHODS TO SHAPE A MEDIUM

(71) Applicant: Universal City Studios LLC, Universal City, CA (US)

(72) Inventor: Steven C. Blum, Orlando, FL (US)

(73) Assignee: Universal City Studios LLC, Universal City, CA (US)

(*) Notice: Subject to any disclaimer, the term of this patent is extended or adjusted under 35 U.S.C. 154(b) by 21 days.

(21) Appl. No.: 16/702,145

(22) Filed: Dec. 3, 2019

(65) Prior Publication Data

US 2021/0037308 A1 Feb. 4, 2021

Related U.S. Application Data

(60) Provisional application No. 62/879,888, filed on Jul. 29, 2019.

(51) Int. Cl.
| | |
|---|---|
| *H04R 1/00* | (2006.01) |
| *G10K 11/00* | (2006.01) |
| *H04R 1/10* | (2006.01) |
| *H04R 1/38* | (2006.01) |
| *G01N 29/024* | (2006.01) |

(52) U.S. Cl.
CPC ......... *H04R 1/1041* (2013.01); *G10K 11/004* (2013.01); *H04R 1/38* (2013.01); *G01N 29/024* (2013.01); *G10K 11/00* (2013.01)

(58) Field of Classification Search
CPC .......... H04R 1/00; H04R 1/025; H04R 1/026; H04R 1/02; H04R 1/28; H04R 1/345; H04R 1/38; H04R 1/1041; H04R 3/00; H04R 3/12; H04R 9/06; H04R 9/063; H04R 11/02; H04R 19/02; G10K 15/00; G10K 15/04; G10K 9/02; G10K 9/18; G10K 9/20; G10K 11/00; G10K 11/004; G10K 11/04; G10K 11/18; G10K 11/22; G01N 29/024
See application file for complete search history.

(56) References Cited

U.S. PATENT DOCUMENTS

| | | | |
|---|---|---|---|
| 3,563,460 A | 2/1971 | Nine | |
| 3,906,658 A | 9/1975 | Gross | |
| 6,065,949 A * | 5/2000 | Kuklinski | ........... B01F 3/04106 425/135 |
| 7,243,857 B2 | 7/2007 | Kallestad | |
| 8,388,139 B2 | 3/2013 | LaDuke | |
| 10,037,752 B1 * | 7/2018 | Colasante | .............. G10K 11/22 |
| 10,040,239 B2 | 8/2018 | Brown, Jr. | |

(Continued)

OTHER PUBLICATIONS

PCT/US2020/043806 International Search Report and Written Opinion dated Oct. 23, 2020.

*Primary Examiner* — Thang V Tran
(74) *Attorney, Agent, or Firm* — Fletcher Yoder, P.C.

(57) ABSTRACT

A system includes a medium disposed on a base, a plurality of transducers coupled to the base, and a controller communicatively coupled to the plurality of transducers such that each individual transducer of the plurality of transducers is individually addressable by the controller. The controller is configured to receive feedback and to instruct at least some of the individual transducers of the plurality of transducers to activate to move the medium on the base to create a shaped surface based on the feedback.

19 Claims, 6 Drawing Sheets

(56) References Cited

U.S. PATENT DOCUMENTS

| | | | |
|---|---|---|---|
| 2006/0049114 A1* | 3/2006 | Haake | G10K 15/00 |
| | | | 210/748.05 |
| 2016/0228991 A1* | 8/2016 | Ryan | B23K 26/144 |
| 2016/0306098 A1 | 10/2016 | Fujita et al. | |
| 2018/0104743 A1 | 4/2018 | Horst | |
| 2018/0304500 A1 | 10/2018 | Putkis | |
| 2019/0087621 A1 | 3/2019 | Khuri-Yakub et al. | |
| 2019/0374764 A1* | 12/2019 | Cai | G10K 15/00 |

\* cited by examiner

SYSTEMS AND METHODS TO SHAPE A MEDIUM

CROSS REFERENCE TO RELATED APPLICATIONS

This application claims priority from and the benefit of U.S. Provisional Application No. 62/879,888, entitled "SYSTEMS AND METHODS TO CONTROL GRANULAR MATERIAL," filed Jul. 29, 2019, and is herein incorporated by reference in its entirety for all purposes.

BACKGROUND

This disclosure relates generally to systems and methods for generating programmable three-dimensional special effects and, specifically, techniques for generating special effects using granular particles.

This section is intended to introduce the reader to various aspects of art that may be related to various aspects of the present disclosure. This discussion is believed to be helpful in providing the reader with background information to facilitate a better understanding of the various aspects of the present disclosure. Accordingly, it should be noted that these statements are to be read in this light and not as admissions of prior art. Throughout amusement parks and other entertainment venues, special effects can be used to help immerse guests in the experience of a ride or attraction. Immersive environments may include three-dimensional (3D) props and set pieces, robotic or mechanical elements, and/or display surfaces that present media. In addition, the immersive environment may include audio effects, smoke effects, and/or motion effects. Thus, immersive environments may include a combination of dynamic and static elements. However, installation of an immersive environment is complex, and certain elements of the immersive environment are difficult to update or change to incorporate new narratives. With the increasing sophistication and complexity of modern ride attractions, and the corresponding increase in expectations among theme or amusement park patrons, improved and more creative attractions are desirable, including ride attractions having more complex immersive environments.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a system includes a medium disposed on a base, a plurality of transducers coupled to the base, and a controller communicatively coupled to the plurality of transducers such that each individual transducer of the plurality of transducers is individually addressable by the controller. The controller is configured to receive feedback and to instruct at least some of the individual transducers of the plurality of transducers to activate to move the medium on the base to create a shaped surface based on the feedback.

In an embodiment, a system includes a medium disposed on a base, a plurality of transducers coupled to the base, a projector configured to project an image toward the base, and a controller communicatively coupled to the plurality of transducers and the projector. Each transducer of the plurality of transducers is configured to be activated to cause local vibration within the medium, and the controller is configured to receive feedback indicative of an operating parameter of the system, instruct at least a portion of the transducers of the plurality of transducers to activate based on the feedback to form a shaped surface from the medium on the base, and instruct the projector to project the image toward the medium and/or the base in response to the feedback.

In an embodiment, a system includes a base, a medium disposed on the base, a plurality of transducers coupled to the base, a user interface, and a controller communicatively coupled to the plurality of transducers and the user interface. Each transducer of the plurality of transducers is configured to be activated to cause local vibration within the medium, and the controller is configured to receive feedback indicative of an operating parameter of the system from the user interface and instruct at least a portion of the transducers of the plurality of transducers to activate based on the feedback to move the medium to form a shaped surface on the base.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
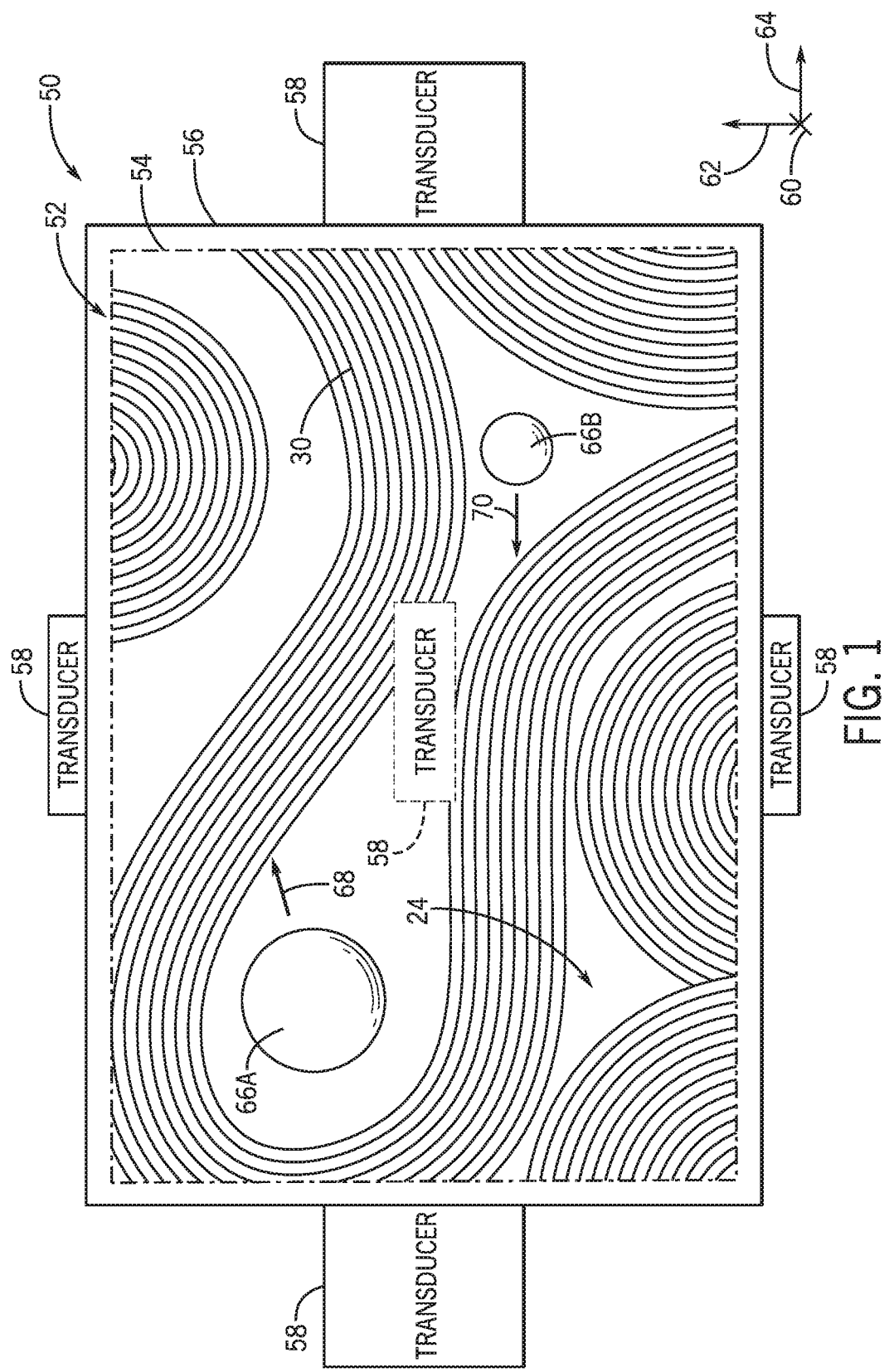
FIG. 1 is a top view of an embodiment of a control system configured to create and control a layout, orientation, or positioning of granular particles to form a shaped surface, in accordance with an aspect of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. One or more specific embodiments of the present embodiments described herein will be described below. In an effort to provide a concise description of these embodiments, all features of an actual implementation may not be described in the specification. It should be noted that in the development of any such actual implementation, as in any engineering or design project, numerous implementation-specific decisions must be made to achieve the developers' specific goals, such as compliance with system-related and business-related constraints, which may vary from one implementation to another. Moreover, it should be noted that such a development effort might be complex and time consuming, but would nevertheless be a routine undertaking of design, fabrication, and manufacture for those of ordinary skill having the benefit of this disclosure.

The present disclosure relates to systems and methods that utilize a medium, such as a shaped granular material, to form three-dimensional (3D) effects that are programmable and dynamic. In an embodiment, the disclosed shaped granular material effects are provided within an entertainment venue, such as an amusement or theme park. Accordingly, the shaped granular material effects may be used to create 3D objects (surfaces, prop elements, texture, etc.) within an attraction or show. Further, the shaped granular material effects may move or shift as part of the overall immersive environment, creating more complex environmental cues to help immerse a guest. In another example, the system may be implemented as an interactive display screen, and the shaped granular material may form a contour onto which an image may be projected to create a more realistic or enhanced image. Embodiments of the present disclosure include a system that may move granular particles into a particular shaped profile or pattern based on operator inputs. The granular material may be formed from granular particles. The granular material may be an aggregate material. As used herein, granular particles may include any suitably sized particle, such as sand, sugar, salt, metal powder, polystyrene, foam, acrylic beads, sawdust, glass microspheres, another suitable particle, or any combination thereof. The granular particles may include particles of different types (sizes, materials) or may be homogenous (e.g., of a same type). The granular particles may be selected based on optical properties such as fluorescence or reflectivity to enhance particular illusions. Further, although the present disclosure primarily discusses manipulation of granular particles, another medium, such as a fluid (e.g., gas, liquid, gel) may be used and manipulated in other embodiments.

Granular particles may provide a surface of an immersive environment that is malleable and easily replaceable. However, achieving standing structures and certain desired contours or profiles using granular particles is complex. Accordingly, automatically moving and positioning the granular particles in a user-defined manner may enhance the formation of granular particles into various profiles. In accordance with embodiments of the present disclosure, a system may have granular particles disposed on a surface. The system also includes one or more individually addressable transducers (e.g., acoustic transducers) that act to cause vibration of the granular particles. Each transducer may be controlled to emit energy (e.g., via an acoustic wave, a mechanical wave, a pressure wave), with particular characteristics in a particular direction such that the combined effect of all of the total waves emitted by the transducers moves the granular particles into the desired profile.

In an embodiment, the transducers cause vibration of the granular particles. The disclosed arrangements may be in contrast to systems such as kinetic tables that transmit vibrations through a single vibrating plate such that the granular particles settle into nodes of the plate. In an embodiment, the container or base holding the granular particles and to which the transducers are coupled may include an internally damped surface such that the vibration caused by each of the transducers is not transmitted through the base itself or has limited transmission through the base. This permits local and predictable vibration effects in the granular particles caused by each transducer that are not confounded or significantly diluted by vibration of the entire base. In another embodiment, the transducers may directly cause local vibration of the base such that the base vibrates an amount dictated by the drive signal for each transducer. The vibrations may cause the granular particles to move into various positions or orientations relative to one another and/or the base, based on a particular property of each generated emission of the respective transducers. Sustaining the vibrations may also maintain the position of the granular particles to maintain the desired profile. The configuration of the transducers to cause the vibrations may be automatically adjusted and based on user input based on the desired profile to move the granular particles accordingly.

Controlled shaping of the granular particles may permit dynamic and complex standing structures to form and disappear as desired. The standing structures may be enhanced with projection mapping that is coordinated with the transducer control to generate illusions over a broad surface using an inexpensive and easily maintained granular material. In this manner, projection mapping may be used to project images onto a floor surface to augment three-dimensional illusions. Floor-based three-dimensional illusions are typically complex, and it may be difficult to effectively maintain an illusion that involves depth on a planar floor material. However, creating shaped surfaces on the floor may not be desirable in situations in which users are also traversing the floor. The disclosed techniques provide a floor surface with depth and texture to enhance three-dimensional illusions generated by projected images. For example, an immersive environment may include a floor surface that users walk upon and that is formed from or includes sand or other granular particles. For example, rippling water illusions may be generated using shaped sand in conjunction with projected images. The shaped surface enhances the water illusion without involving a costly shaped display surface.

The disclosed techniques also permit reshaping or replenishing of the granular particles via agitation after undesirable movement and/or disruption of the granular particles (e.g., footprints) caused by user interaction with the granular particles, or to remove trash or debris that may interfere with programmed projection mapping onto the floor surface. Agitation or programmed activation of transducers may smooth or shape the granular particles in an immersive environment to reset the floor after each attraction operation cycle. In this manner, the provided interactive floor surface suitable for three-dimensional illusions is cost-effective and easy to maintain.

Turning now to the drawings, FIG. 1 is a schematic top view of an embodiment of a shaped surface 24 formed by a control system 50 configured to create and control a pattern, orientation, or positioning of granular particles 52. The shaped surface 24 is depicted as a Zen garden, including patterns of waves 30 distributed in a pattern. However, it should be noted that the depicted shaped surface 24 is by way of example, and other configurations are contemplated. Further, the depicted shaped surface 24 may transition to other shaped surfaces 24 during the course of an event or attraction. That is, the shaped surface 24 may be dynamic or static as provided herein.

The granular particles 52 may be disposed on an underlying base 54 in an amount that at least partially covers the base 54 (e.g., covers at least 20% of the surface area of the base 54, at least 50% of the surface area). In one embodiment, the base 54 may include a lip or barrier 56 surrounding at least a portion of a perimeter of the base 54 to block the granular particles 52 from moving off the base 54. That is, the barrier 56 may contain the granular particles 52 on the base 54 and permit the granular particles 52 to experience the vibration effects caused by the control system 50. In an additional or an alternative embodiment, the barrier 56 may be moveable and/or the control system 50 may not include the barrier 56 to permit the granular particles 52 to flow off the base 54 more easily (e.g., in a waterfall effect or to permit cleaning or replacement). For example, when used granular particles 52 are to be replaced, the granular particles 52 may be directed or forced off the base 54 to clear the base 54 of granular particles 52 and new granular particles 52 may be added onto the base 54.

The control system 50 includes a plurality of transducers 58 (e.g., arranged in an array), that may be activated to move the granular particles 52 relative to the base 54, such as to form a desired shaped surface 24 of the granular particles 52 on the base 54. Each transducer 58 may be coupled to the base 54 via a housing 59. The housing 59 may include one or more damping structures to restrict transfer of energy from the activated transducer 58 to the coupled base 54 and/or transfer of energy between transducers 58. The damping structures may include acoustically or mechanically absorptive materials, such as foam, air bladders or other structures with air gaps. For example, individual transducers 58 may be positioned in direct or indirect contact with the base 54, including around at least a perimeter of the base 54 (e.g., against the barrier 56 and/or a side of the base 54) and/or above or below the base 54 relative to a vertical axis 60. In an embodiment, upon activation, each transducer 58 may emit a wave that causes vibrations transmitted through and/or across the granular particles 52 to displace and excite (e.g., vibrate) the granular particles 52 according to the drive signal of each transducer 58. The waves may be controlled to move and orient the granular particles 52 in a certain manner to create the desired shaped surface 24 from the granular particles 52. In an example embodiment, the waves may include acoustic or sound waves (e.g., having a low frequency that may not be audible to the human ear). In an additional or an alternative embodiment, the waves may include mechanical waves (e.g., a physical vibration of the base 54). In certain embodiments, the base 54 may be segmented. Each segment of the base 54 may include merely a portion of the transducers 58 and may be physically separated from adjacent segments via intervening structures or air gaps to damp vibrations between adjacent base segments. In this manner, vibration of the base 54 in each segment may have reduced effects on the adjacent segments.

Each transducer 58 may be controlled independently from one another to orient the granular particles 52 as desired into a shaped surface 24 and to transition to different shaped surfaces 24. The produced vibrations may cause the granular particles 52 to move towards or away from the base 54 relative to the vertical axis 60 (e.g., orthogonal to a plane formed by a lateral axis 62 and a longitudinal axis 64) and/or crosswise to the vertical axis 60. Sustaining the vibrations may also maintain the granular particles 52 at a particular orientation. In other words, activating the transducers 58 to cause the vibrations may initially cause the granular particles 52 to move in a particular direction and into a certain profile or characteristic shaped surface 24. As the transducers 58 continue to be active, the profile of the granular particles 52 is maintained. It should be noted that while the profile of the granular particles 52 is maintained, the granular particles 52 may continue to oscillate. Thus, the sustained profile of the granular particles 52 may be considered a standing wave, which may include resonant frequencies in all or a portion of the granular particles 52. However, the general position of the granular particles 52 may be substantially maintained to maintain the profile of the granular particles 52. Indeed, the standing wave may be generated based on properties of the granular particles 52, such as the size, color, mass, and so forth, of the granular particles 52. In one embodiment, objects or props 66 may form part of the control system 50. The presence of the props 66 may influence the shaped surface 24, for example by causing obstacles to the propagation of a planar wave across the base 54. In an embodiment, the vibrations may be of sufficient force to move one or more props 66 to new positions on the base 54 in a controlled manner. Such movement may be part of a desired illusion.

It should be noted that the granular material that includes the granular particle 52 may be selected based on a desired property of the granular particles 52, such as a desired movement or appearance of the granular particles 52. For instance, the granular particles 52 may each have a particularly selected size. Larger sized granular particles 52 may be held more steadily than smaller sized granular particles 52, but smaller sized granular particles 52 may be moved more easily than larger sized granular particles 52. The granular particles 52 may also have a certain surface characteristic, such as a particular roughness. For example, increasing the roughness of the surface of each granular particle 52 results in the position of granular particles 52 relative to one another being held more securely due to increased friction between the granular particles. Increased friction may further be achieved by forming the granular particles 52 into geometric shapes having an increased surface area to enable greater contact between the granular particles 52. The granular particles 52 may have additional or alternative properties, such as a visual appearance (e.g., color, shape), a mass, a specific heat, a magnetic characteristic, a chemical characteristic, an electrical characteristic, another suitable property, or any combination thereof that may be selected based on a particular application of the control system 50.

Figure 2:
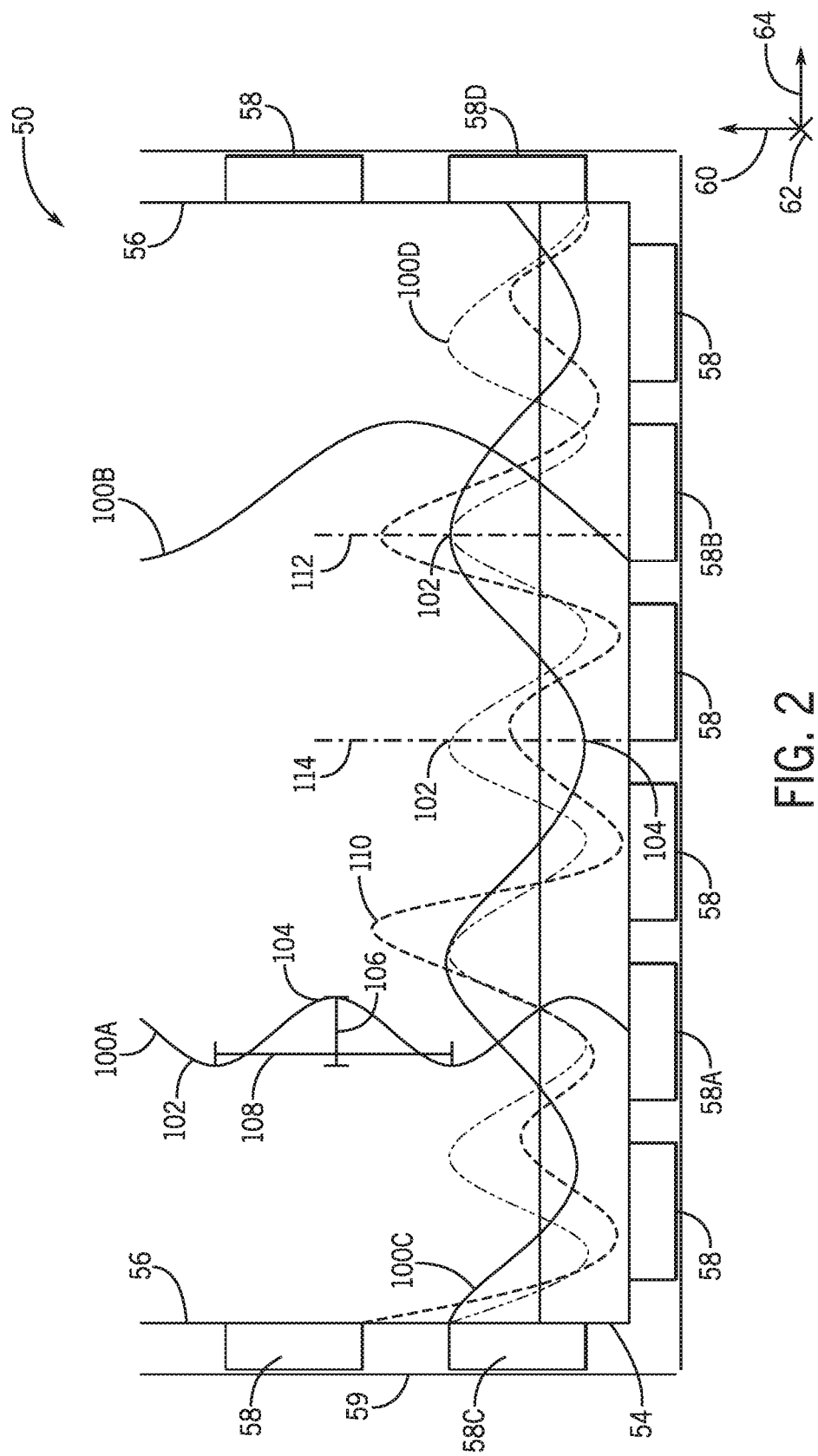
FIG. 2 is a side view of an embodiment of the control system having transducers emitting energy to cause movement of granular particles, in accordance with an aspect of the present disclosure.

FIG. 2 is a side view of an embodiment of the control system 50 having the base 54, the barrier 56, and the transducers 58. As shown in the side view, the transducers 58 may be arranged on or in the base 54 and arranged on or in the side barrier/s 56 (e.g., that run parallel to the vertical axis 60) As illustrated, each transducer 58 is configured to cause local vibrations of the granular particles 52, whereby the vibrations are caused by emitted waves 100. Each wave 100 may continually displace a medium (e.g., displace air for a sound wave, displace the base 54 for a mechanical wave)

and be emitted having characteristics that alternate the medium between a crest 102 (e.g., a high point) and a trough 104 (e.g., a low point). Each wave 100 may have a characteristic amplitude 106, which is a difference between the crest 102 and the trough 104, and a period 108, which is a full cycle or completion of the crest 102 and the trough 104. Each transducer 58 may emit a differently shaped wave 100 depending on the orientation of the transducer 58 relative to the base 54 as well as the control signal driving the transducer 58. For example, a first transducer 58A may cause a vibration orthogonal to the plane formed by the axes 62, 64 by emitting a first wave 100A and a second transducer 58B may cause a vibration orthogonal to a plane formed by the axes 62, 64 by emitting a second wave 100B that may have a larger amplitude 106 and a longer period 108 than those of the first wave 100A. In an alternative embodiment, the first wave 100A may have the same period 108 as that of the second wave 100B and/or may have the same amplitude 106 as that of the second wave 100B, but the first wave 100A may be generated at a different time than the second wave 100B. That is, the first wave 100A may be similarly shaped as the second wave 100B, but the first wave 100A may have the crest 102 and the trough 104 at different positions as compared to the crest 102 and the trough 104, respectively, of the second wave 100B relative to the vertical axis 60.

The waves 100A, 100B may not interfere with one another to modify the respective waves 100A, 100B. However, certain transducers 58 may emit waves that do interfere with one another. For instance, a third transducer 58C may emit a wave orthogonal to a plane formed by the axes 60, 62 (e.g., parallel to the longitudinal axis 64) having a third wave 100C that interferes with another fourth wave 100D as emitted orthogonal to the plane formed by the axes 60, 62 by a fourth transducer 58D. In the illustrated embodiment, the third transducer 58C may be positioned directly across the fourth transducer 58D, such that the third wave 100C and the fourth wave 100D are emitted at one another. Emitting the third wave 100C and the fourth wave 100D directly towards one another may combine the waves 100C, 100D together. In other words, the third wave 100C and the fourth wave 100D may superimpose based on a respective displacement caused by the third wave 100C and fourth wave 100D and produce a superimposed wave 110. For example, at a first position 112, in which the respective crests 102 of the third wave 100C and the fourth wave 100D substantially align, the third wave 100C and the fourth wave 100D may add together. However, at a second position 114, the crest 102 of the fourth wave 100D may substantially align with the trough 104 of the third wave 100C. As a result, the third wave 100C may be subtracted from the fourth wave 100D, and the third wave 100C and the fourth wave 100D may substantially cancel each other out. The different transducers 58 may be controlled to create a particularly shaped superimposed wave 110, which may not otherwise be effectively created by individual transducers 58, in order to create a particular shaped surface (see FIG. 1) of the granular particles 52. It should be noted that although FIG. 2 illustrates that the superimposed wave 110 is created via transducers 58C, 58D that are positioned across from one another, the superimposed wave 110 may additionally or alternatively be created via transducers 58 at different positions relative to one another. For instance, the first wave 100A emitted by the first transducer 58A may interfere with the third wave 100C and/or the fourth wave 100D to change the shape of the superimposed wave 110.

Each transducer 58 may also be configured to move relative to the base 54 and the barrier 56 to change where the local vibration propagates. For instance, each transducer 58 may mechanically actuate relative to the vertical axis 60, the lateral axis 62, and/or the longitudinal axis 64. Additionally or alternatively, each transducer 58 may rotate (e.g., about an axis extending parallel to the vertical axis 60, an axis extending parallel to the lateral axis 62, and/or an axis extending parallel to the longitudinal axis 64). Changing the orientation of the transducers 58 to change the property of the propagating vibration may also change how the granular particles 52 move relative to the base 54, thereby changing the profile of the granular particles 52. In an additional or an alternative embodiment, a portion of the base 54 and/or the barrier 56 may be configured to move. As an example, a portion of the base 54 may move orthogonal to the plane formed by the axes 62, 64. Thus, the granular particles 52 disposed at that portion of the base 54 may also move orthogonal to the plane formed by the axes 62, 64 with the base 54 to change the profile of the granular particles 52. Moreover, movement of the base 54 and/or the barrier 56 may change the property of the waves 100 emitted by the transducers 58, further changing the produced movement of the granular particles 52. For example, moving a part of the base 54 and/or the barrier 56 may cause one of the waves 100 to deflect, diffract, refract, and the like.

The control system 50 may additionally include other components that may be used to move the granular particles 52. By way of example, the control system 50 may also include a fan, a magnet (e.g., for granular particles 52 that have magnetic properties), a fluid sprayer, another suitable component, or any combination thereof. Such components may also be controlled to facilitate creating a desired profile with the granular particles 52. In one example, the control system 50 may activate one or more electromagnets coupled to the base 54 to strengthen the effects caused by the active transducers 58 on magnetic or metal granular particles 52. The polarity of the magnetic force may be used to create desired shapes or patterns.

Figure 3:
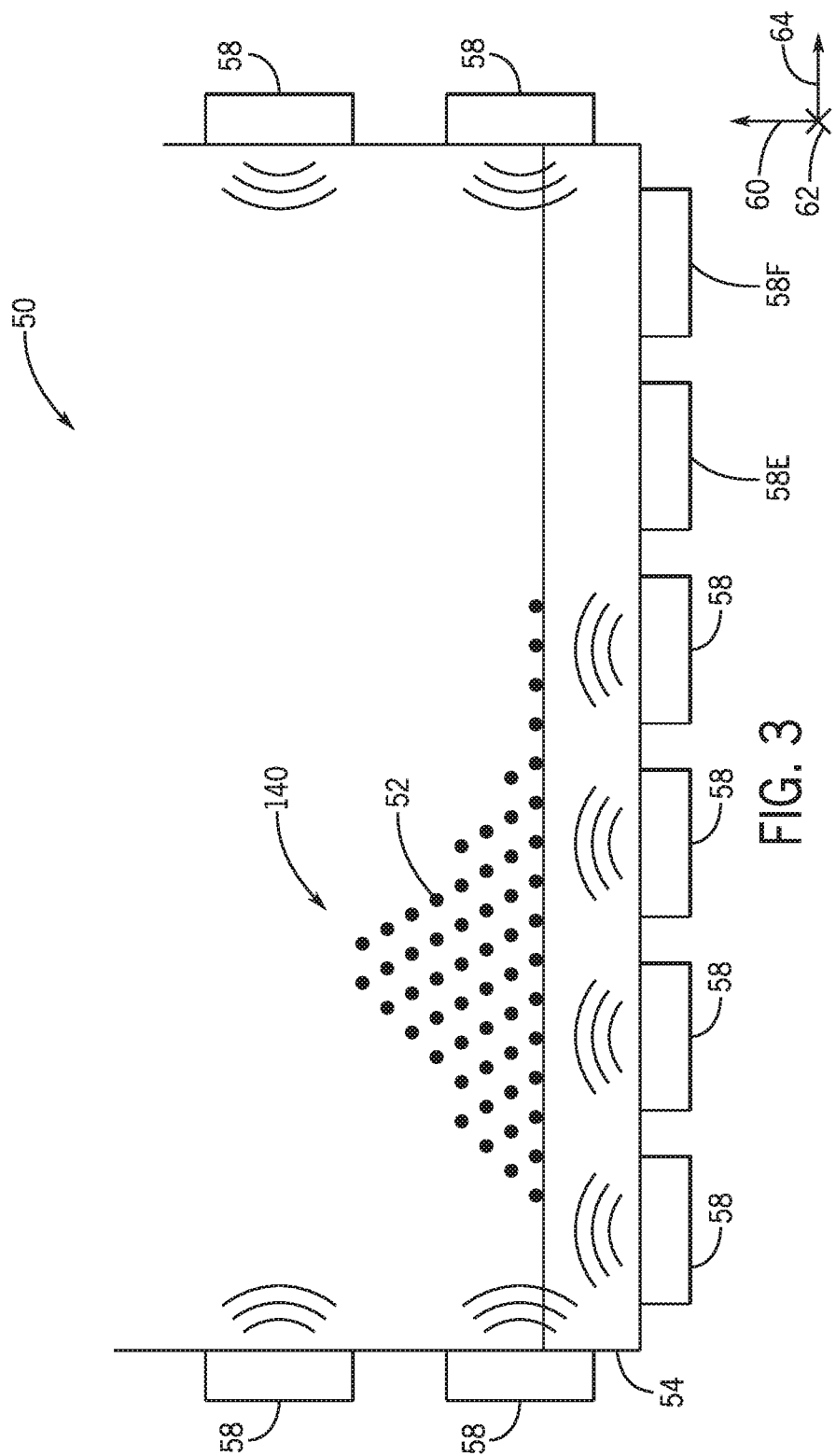
FIG. 3 is a side view of an embodiment of the control system having the transducers activated to orient the granular particles in a particular profile to form a shaped surface, in accordance with an aspect of the present disclosure.

FIG. 3 is a side view of an embodiment of the control system 50 having the transducers 58 activated to orient the granular particles 52 in a particular profile 140. In the illustrated embodiment, the profile 140 includes an approximately triangular shape extending away from the base 54 relative to the vertical axis 60. For example, certain transducers 58 may activate to cause vibrations in the granular particles 52, while a remainder of transducers 58 (e.g., a fifth transducer 58E and a sixth transducer 58F) may not be activated to cause vibrations. As a result, the granular particles may move away from the transducers 58E, 58F that are not activated, and move toward and/or stack adjacent to the transducers 58 that are activated. Continuously activating the transducers 58 in the described manner to sustain the vibrations may maintain the profile 140.

Figure 4:
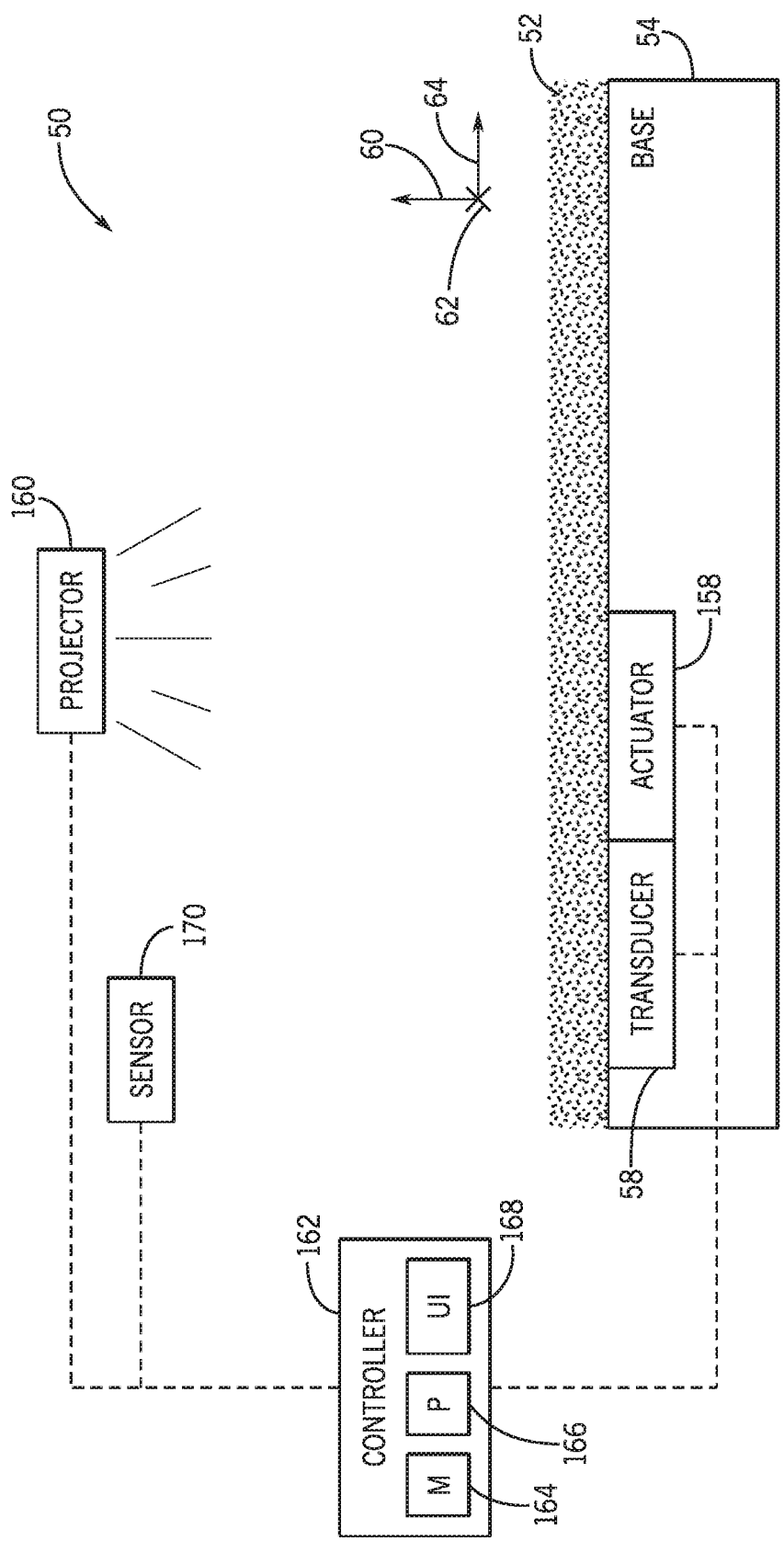
FIG. 4 is a schematic of an embodiment of the control system having the granular particles, the shaped surface, the transducer, an actuator, and a projector, in accordance with an aspect of the present disclosure.

FIG. 4 is a schematic of an embodiment of the control system 50 having the granular particles 52, the base 54, the transducer 58, an actuator 158 configured to move the transducer 58 relative to the base 54, and a projector 160 that may project an image onto the granular particles 52 and the base 54. The transducer 58 may cause the granular particles 52 to form a particular profile and the projector 160 may project an image onto the formed profile of the granular particles 52, such as onto a surface of the granular particles exposed to the projector 160. Moreover, the actuator 158 may be controlled to control a position or orientation of the transducer 58 relative to the base 54. By way of example, the actuator 158 may be configured to move relative to the vertical axis 60, the lateral axis 62, and/or the longitudinal axis 64 (e.g., linearly), and/or may rotate about an axis oriented in any manner relative to the vertical axis 60, the lateral axis 62, and the longitudinal axis 64. The actuator 158 may include a spring, an electric actuator, a pneumatic actuator, a hydraulic actuator, another suitable actuator, or any combination thereof, that may be operated by the controller 162 to move the transducer 58 relative to the base 54. As mentioned, such movement of the actuator 158 may change how waves are emitted by the transducer 58, and may change how the granular particles 52 move relative to the base 54.

The control system 50 may include a controller 162 having a memory 164 and a processor 166. The memory 164 may include volatile memory, such as random access memory (RAM), and/or non-volatile memory, such as read-only memory (ROM), optical drives, hard disc drives, solid-state drives, or any other non-transitory computer-readable medium that includes instructions to operate the control system 50. The processor 166 may be configured to execute such instructions. For example, the processor 166 may include one or more application specific integrated circuits (ASICs), one or more field programmable gate arrays (FPGAs), one or more general purpose processors, or any combination thereof. The controller 162 may also include a user interface 168, such as a touch screen, a trackpad, a button, a switch, another suitable component, or any combination thereof, with which a user may interact to operate the control system 50. The controller 162 may receive a user input as a result of the interaction between the user and the user interface 168, and may operate the transducer 58, the actuator 158, and/or the projector 160 based on the user input.

The controller 162 may be communicatively coupled to the transducer 58 and the projector 160 to project an image onto the profile of the granular particles 52. In one embodiment, the transducer 58 and/or the actuator 158 may be operated to move the granular particles 52 while the projector 160 may simultaneously project multiple image frames onto the granular particles 52 to produce a three-dimensional video animated by the granular particles 52. For example, the transducer 58 may be pre-programmed to emit a particular wave at various times of the operation of the control system 50, the actuator 158 may be pre-programmed to move the transducer 58 at various times of the operation of the control system 50, and the projector 160 may also be pre-programmed to project a particular image at various times of the operation of the control system 50. The coordination between the actuator 158, the transducer 58, and the projector 160 may enable the video animation of the granular particles 52. The controller 162 may be configured to store different combinations of pre-programmed operations of the transducer 58, the actuator 158, and/or projector 160. Such combinations may be selectable via the user interface 168, and the control system 50 may operate the transducer 58, the actuator 158, and/or the projector 160 based on the selected combination.

In an additional or an alternative embodiment, the projector 160 may project an image based on the profile of the granular particles 52. As an example, the controller 162 may be communicatively coupled to a sensor 170 configured to determine an operating parameter of the control system 50, such as a current profile of the granular particles 52. The sensor 170 may determine a positioning of the granular particles 52 relative to the vertical axis 60, the lateral axis 62, and/or the longitudinal axis 64 relative to the base 54. The projector 160 may receive feedback from the sensor 170 indicative of the positioning and, based on the determined positioning, the projector 160 may project a corresponding image. For instance, the projector 160 may project a first color onto a first area of the base 54 having the granular particles 52 stacked at a first height relative to the vertical axis 60, and the projector 160 may project a second color onto a second area of the base 54 having the granular particles 52 stacked at a second height relative to the vertical axis 60. Adjusting the profile of the granular particles 52 may cause the projector 160 to change the image projected onto the granular particles 52 automatically based on the feedback transmitted by the sensor 170. By way of example, the user interface 168 may be used to control the transducer 58 and/or the actuator 158 to change the profile of the granular particles 52, and the projector 160 may project an image onto the granular particles 52 accordingly. In this manner, the projector 160 may dynamically map the image onto the exposed surface of the plurality of granular particles 52.

Figure 5:
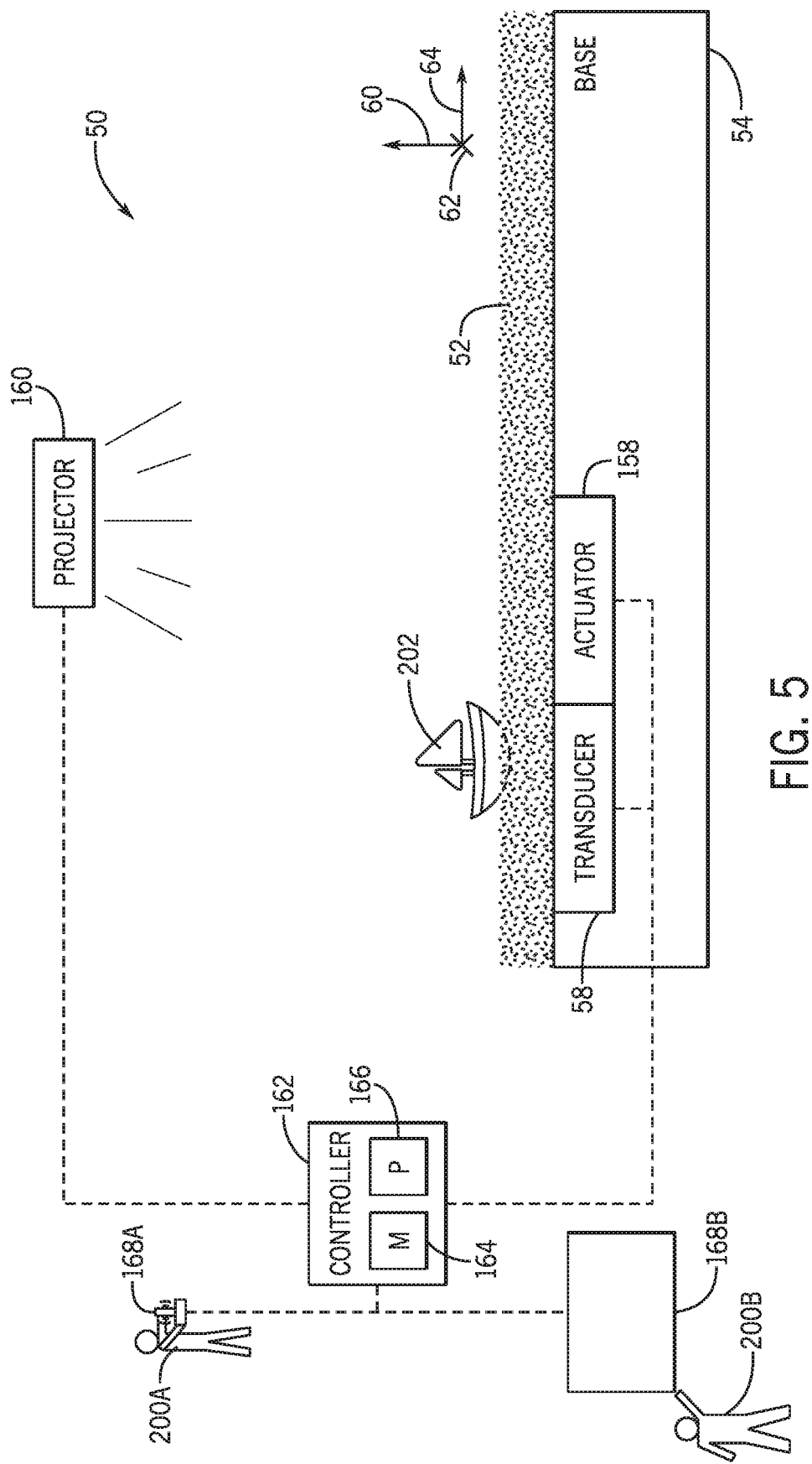
FIG. 5 is a schematic view of an embodiment of the control system having different user interfaces configured to receive a user input, in accordance with an aspect of the present disclosure.

FIG. 5 is a schematic view of an embodiment of the control system 50 having different user interfaces 168 configured to receive a user input. In the illustrated embodiment, the control system 50 includes a first user interface 168A utilized by a first user 200A and a second user interface 168B utilized by a second user 200B. The first user interface 168A may include a joystick, a slider, a knob, a switch, a button, another suitable component, or any combination thereof that enables the first user 200A to control at least one of the transducers 58 and/or actuators 158 directly, such as to adjust a position of one of the transducers 58 and/or actuators 158 relative to the base 54. The first user 200A may additionally or alternatively use the first user interface 168A to adjust the wave emitted by one of the transducers 58. To this end, the controller 162 is configured to receive feedback (e.g., a user input) indicative of an interaction between the first user 200A and the first user interface 168A, and the controller 162 may adjust an operation of the transducer 58 and/or the actuator 158 based on the received feedback. In this manner, the first user 200A may use the first user interface 168A to change how waves are emitted and may directly change the profile of the granular particles 52. The user interface 168 may be used to train the control system 50 to form desired shapes. For example, the user input may be indicative of a direct manipulation of the granular particles 52, such as a target shape or profile of the granular particles 52, an adjustment of a current shape or profile of the granular particles 52, or any combination thereof.

In an example embodiment, the control system 50 may have a prop 202 disposed within the granular particles 52, and the first user 200A may use the first user interface 168A to move the prop 202 relative to the base 54. That is, the first user 200A may adjust the waves emitted by the transducer 58 and/or select an orientation of the transducer 58 to move the granular particles 52 relative to the base 54, thereby driving the prop 202 to move relative to the base 54. Adjusting a property (e.g., the amplitude 106 and/or the period 108 of the associate wave 100) of the wave may change the movement of the granular particles 52 relative to the base 54 and change the movement of the prop 202 relative to the base 54 as well. In this manner, the users 200 may operate the control system 50 to move various props 202 relative to one another, such as to race vehicles within the granular particles 52, by way of example.

The second user interface 168B may include a touchscreen, computing device, display, another suitable component, or any combination thereof that enables the second user 200B to select a particular operation, such as a pre-programmed operation, of the control system 50. For instance, the controller 162 may receive feedback from the second user 200B indicative of a selected operation, and the controller 162 may operate the transducer 58, the actuator 158, and/or the projector 160 based at least in part on the selected operation. In other words, the second user 200B may select a particular pre-programmed operation of the control system 50 via the second user interface 168B, and the controller 162 may automatically operate the control system 50 based on the selected pre-programmed operation. For example, based on the selected pre-programmed operation, the controller 162 may operate the transducer 58 and/or the actuator 158 to form a particular profile of the granular particles 52, and also to operate the projector 160 to project a particular image onto the granular particles 52. In another example, the selected pre-programmed operation may be indicative of a particular movement and/or of a target position of the prop 202, and the controller 162 may operate the transducer 58 and/or the actuator 158 based on the selected pre-programmed operation to move the prop 202 in accordance with the particular movement.

Figure 6:
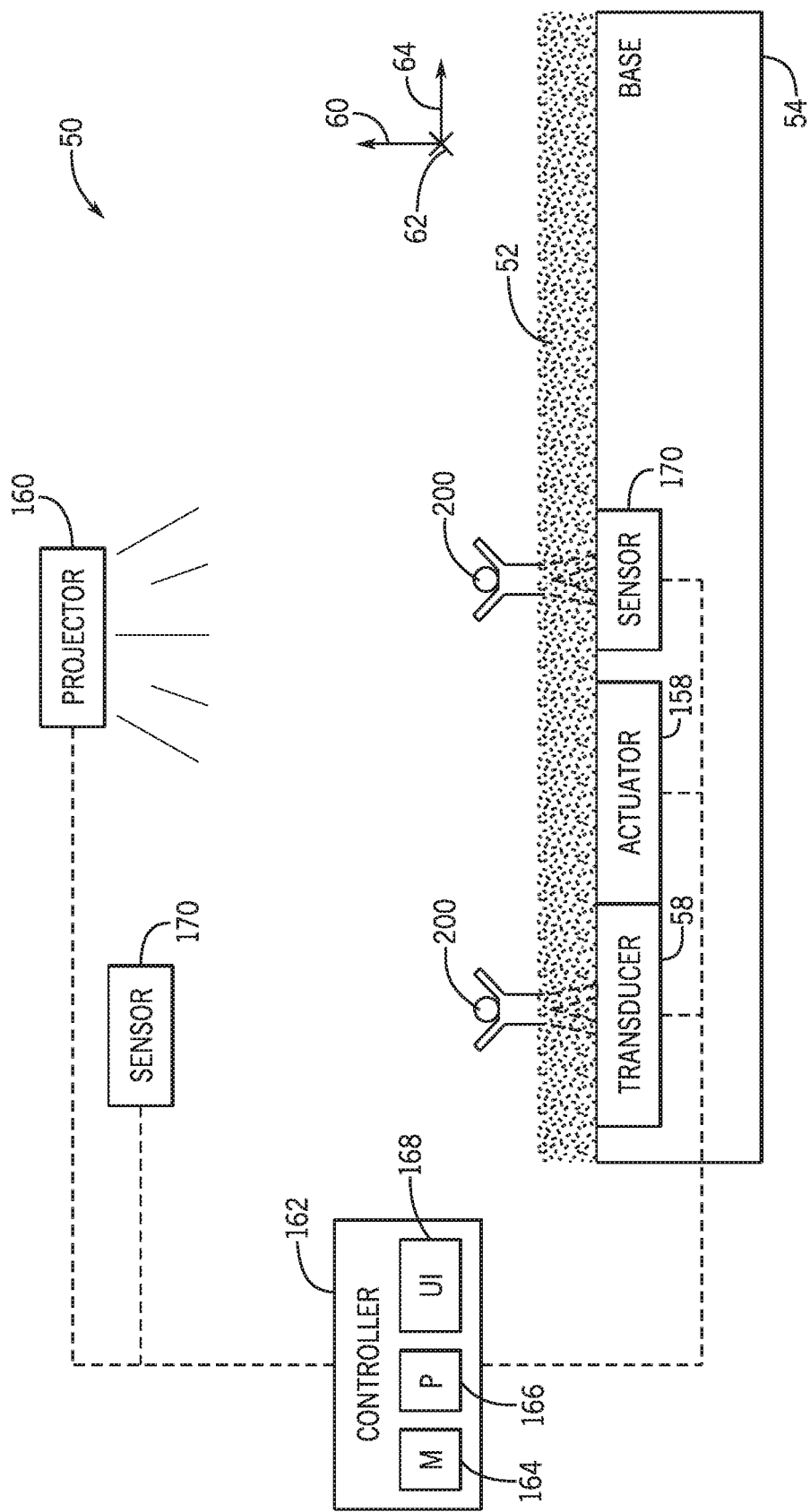
FIG. 6 a schematic of an embodiment of the control system, in which users may be positioned on the granular surface formed by the control system, in accordance with an aspect of the present disclosure.

FIG. 6 is a schematic of an embodiment of the control system 50, in which the users 200 may be positioned directly on the granular particles 52 on the base 54. The controller 162 may operate the control system 50 based on the action of the users 200. In one embodiment, the controller 162 may operate the transducer 58 and/or the actuator 158 to create a particular profile of the granular particles 52 and/or to move the granular particles 52 in a particular manner based on the position of the users 200 about the base 54. For example, the controller 162 may instruct the transducer 58 to emit a wave that positions the granular particles 52 around the users 200, such that the users 200 do not step on the granular particles 52 to create a seas parting illusion. In an additional or an alternative embodiment, the controller 162 may create a particular profile of the granular particles 52 and/or move the granular particles 52 in a particular manner based on an interaction between the users 200 and the base 54. As an example, the controller 162 may instruct the transducer 58 to cause a local vibration that moves the granular particles 52 in a circular movement around a particular user 200 that is stationary relative to the base 54, and the controller 162 may instruct the transducer 58 to emit a wave causing a local vibration that moves the granular particles 52 linearly with another particular user 200 that is moving relative to the base 54. Such movement of the granular particles 52 may create an effect of the granular particles 52 flowing around the user 200 as they walk.

In the illustrated embodiment, the controller 162 may use machine vision, or analysis of images (e.g., of the granular particles 52, the base 54) to operate the control system 50. For instance, the sensor 170 may transmit feedback to the controller 162 indicative of a condition (e.g., visual appearance, composition) of the granular particles 52 and/or of the base 54, and the controller 162 may operate the control system 50 based on the feedback. In one embodiment, the sensor 170 may be a position sensor configured to determine the position of the users 200 relative to the base 54. For example, the sensor 170 may be a light detection and ranging (LIDAR) sensor, a camera, an electro-optical sensor, another suitable position sensor, or any combination thereof. The sensor 170 may be positioned above the base 54 relative to the vertical axis 60 to enable the sensor 170 to determine where the users 200 are positioned on the base 54. Additionally or alternatively, the sensor 170 may be a pressure sensor configured to determine a force exerted by the users 200 onto the base 54. Based on the position of the sensors 170 that determines the force, the controller 162 may determine where the users 200 are positioned relative to the base 54. For example, the sensor 170 may be positioned underneath the base 54 relative to the vertical axis 60. Each sensor 170 is configured to determine a presence of a force, which corresponds to a weight of one of the users 200. The controller 162 may receive feedback from the sensors 170 indicative of the force and, based on the sensors 170 that indicate the presence of the force, the controller 162 may determine a location of the force to determine the location of the users 200 relative to the base 54. In a further embodiments, the sensor 170 may be a motion sensor, such as an ultrasonic sensor, a velocimeter, a passive infrared sensor, a vibration sensor, or any combination thereof, configured to detect a movement and determine location of such movement relative to the base 54. The controller 162 may determine the location of the users 200 relative to the base 54 based on detected movement. Other embodiments of sensors 170 may also be used, including an acoustic transducer, an infrared radiometer, and/or any other suitable sensor.

Moreover, the sensor 170 may be configured to determine an operating parameter of the granular particles 52, and the controller 162 may operate the control system 50 based on the determined operating parameter. For instance, the sensor 170 may be an image sensor configured to detect impurities in the granular particles 52, such as dirt, debris, or other unwanted particles, based on a captured image (e.g., a coloration characteristic of the image) of the granular particles 52. The controller 162 may then instruct the transducer 58 to emit a wave to move the granular particles 52 based on the detected impurities, such as by moving the granular particles 52 off the base 54 to enable new granular particles 52 to be added onto the base 54. In this manner, the control system 50 may be utilized for self-maintaining the granular particles 52 and/or the base 54. The sensor 170 may also determine additional or alternative operating parameters of the control system 50, such as the temperature of the granular particles 52, a force exerted onto the granular particles 52, a time of operation of the control system 50, another suitable operating parameter, or any combination thereof. The controller 162 may then operate the control system 50 to move the granular particles 52 and/or to maintain a position of the granular particles 52 based on the operating parameter.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:
1. A system, comprising:
a medium disposed on a base;
a plurality of transducers coupled to the base;

an actuator coupled to a transducer of the plurality of transducers; and a controller communicatively coupled to the plurality of transducers such that each individual transducer of the plurality of transducers is individually addressable by the controller, wherein the controller is configured to:

receive feedback and to instruct at least some of the individual transducers of the plurality of transducers to activate to move the medium on the base to create a shaped surface based on the feedback; and instruct the actuator to move the transducer relative to the base in response to the feedback.

2. The system of claim 1, wherein each individual transducer of the plurality of transducers, when active, generates an acoustic wave, a mechanical wave, or any combination thereof.

3. The system of claim 1, comprising a sensor configured to determine an operating parameter of the system, wherein the feedback comprises the operating parameter, and wherein the operating parameter comprises one or more characteristics of the shaped surface, a force exerted onto the base, a temperature of the medium, a force exerted onto the medium, a time of operation of the system, or any combination thereof.

4. The system of claim 1, wherein the controller comprises a user interface, and the feedback is a user input received from the user interface.

5. The system of claim 4, wherein the user input is indicative of a direct manipulation of the medium.

6. The system of claim 1, wherein the medium comprises a plurality of granular particles, a fluid, or any combination thereof.

7. A system, comprising:

a medium disposed on a base;

a plurality of transducers coupled to the base, wherein each transducer of the plurality of transducers is configured to be activated to cause local vibration within the medium;

a projector configured to project an image toward the base; and a controller communicatively coupled to the plurality of transducers and the projector, wherein the controller is configured to:

receive feedback indicative of an operating parameter of the system;

instruct at least a portion of the transducers of the plurality of transducers to activate based on the feedback to form a shaped surface from the medium on the base; and instruct the projector to project the image toward the medium and/or the base in response to the feedback.

8. The system of claim 7, wherein the feedback is indicative of a profile of the medium, and wherein the controller is configured to instruct the projector to project the image toward the base to align the image with the shaped surface based on the profile.

9. The system of claim 7, wherein the feedback comprises a user selection of a combination of a pre-programmed operation of the plurality of transducers and a pre-programmed operation of the projector, and wherein the controller is configured to instruct each transducer of the plurality of transducers to emit a particular wave and to instruct the projector to project a particular image toward the medium and/or the base in response to the user selection.

10. The system of claim 7, wherein projecting the image toward the medium and/or the base comprises dynamically mapping the image onto an exposed surface of the medium.

11. The system of claim 7, comprising a barrier surrounding and in contact with at least a portion of a perimeter of the base, wherein a transducer of the plurality of transducers is positioned against the barrier.

12. The system of claim 7, wherein the plurality of transducers comprises a first transducer configured to emit a first wave to cause a first vibration and a second transducer configured to emit a second wave to cause a second vibration, wherein the controller is configured to instruct the first transducer to emit the first wave to interfere with the second wave emitted by the second transducer.

13. The system of claim 7, comprising a prop disposed within the medium, wherein the feedback is indicative of a target position of the prop relative to the base, and the controller is configured to instruct at least the portion of transducers of the plurality of transducers to activate to move the prop toward the target position.

14. A system, comprising:

a base;

a medium disposed on the base;

a plurality of transducers coupled to the base, wherein each transducer of the plurality of transducers is configured to be activated to cause local vibration within the medium;

a user interface; and a controller communicatively coupled to the plurality of transducers and the user interface, wherein the controller is configured to:

receive feedback indicative of an operating parameter of the system from the user interface; and instruct at least a portion of the transducers of the plurality of transducers to activate based on the feedback to move the medium to form a shaped surface on the base.

15. The system of claim 14, wherein the feedback is indicative of a selected orientation of a transducer of the plurality of transducers relative to the base, a selected wave to be emitted by a transducer of the plurality of transducers, a selected pre-programmed operation of a transducer of the plurality of transducers, or any combination thereof.

16. The system of claim 14, wherein the controller is configured to instruct an actuator of the system to drive a transducer of the plurality of transducers to move relative to the base.

17. The system of claim 14, wherein the user interface comprises a touchscreen, a computing device, a display, a joystick, a slider, a knob, a switch, a button, or any combination thereof.

18. The system of claim 14, comprising one or more damping structures that at least partially isolate individual transducers of the plurality of transducers from one another or the base.

19. The system of claim 14, wherein the feedback is transmitted from a sensor of the system, wherein the sensor is configured to detect an operating parameter of the medium, and the sensor is a position sensor, a pressure sensor, a motion sensor, an image sensor, an acoustic transducer, an infrared radiometer, or any combination thereof.

* * * * *